F. A. RIES.
SPACED METALLIC PANEL CONSTRUCTION.
APPLICATION FILED MAR. 27, 1915.
1,202,316.
Patented Oct. 24, 1916.
2 SHEETS—SHEET 1.
Fig. 1,
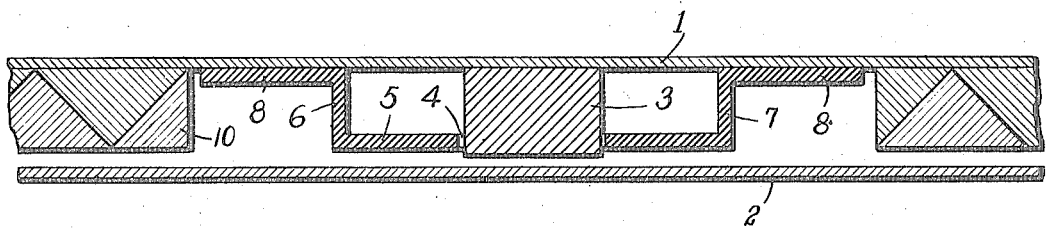
Fig. 2,
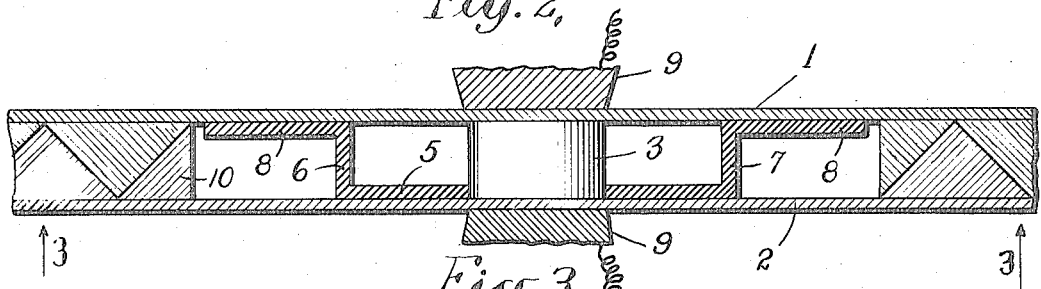
Fig. 3,
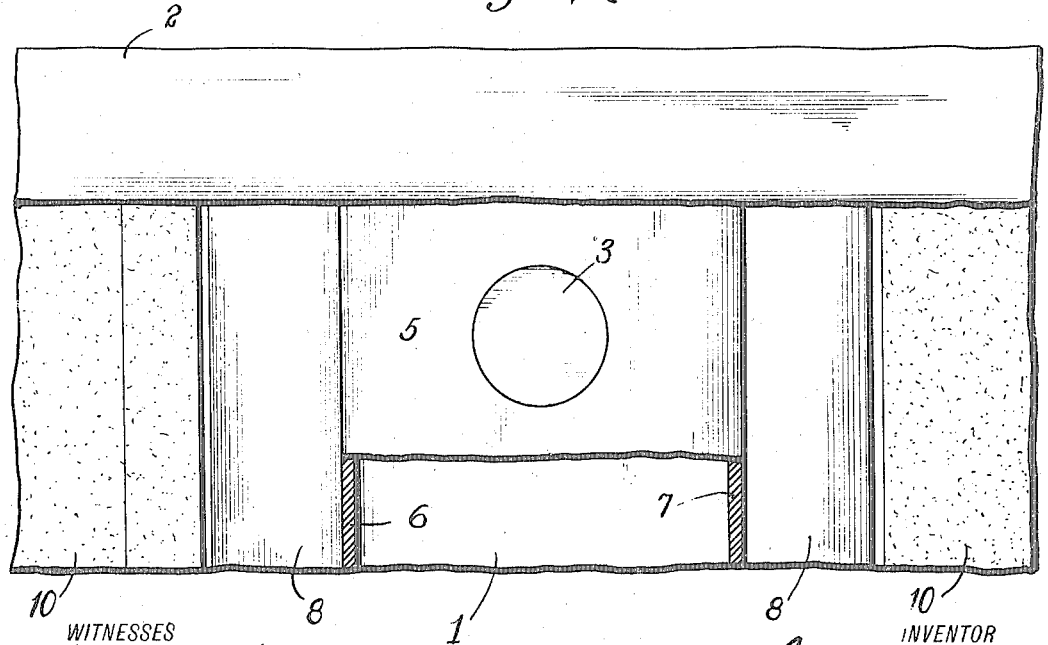
WITNESSES
INVENTOR
BY
ATTORNEY F. A. RIES.
SPACED METALLIC PANEL CONSTRUCTION.
APPLICATION FILED MAR. 27, 1915.
1,202,316.
Patented Oct. 24, 1916.
2 SHEETS—SHEET 2.
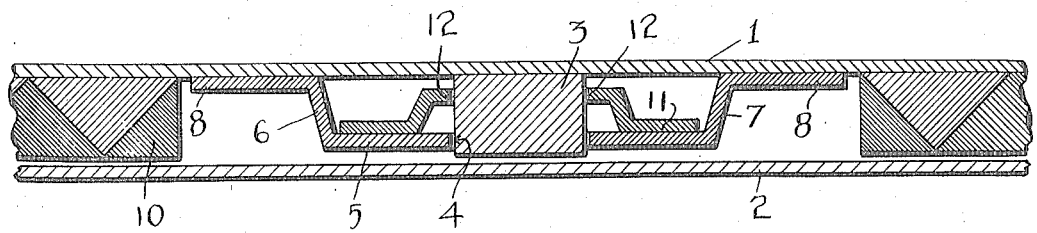
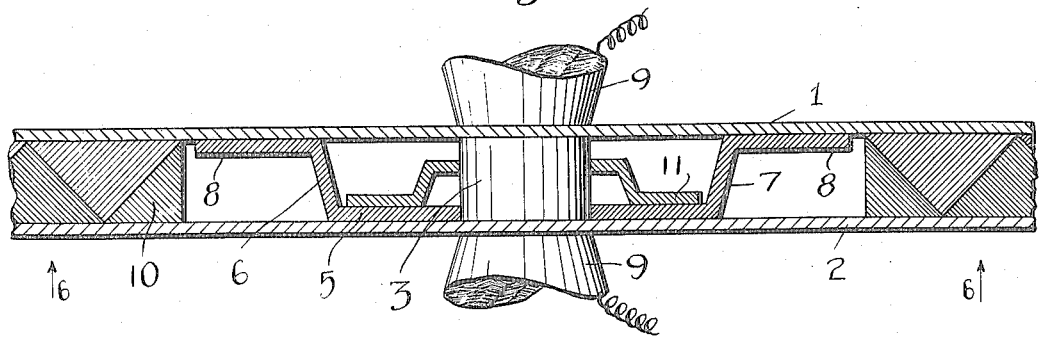
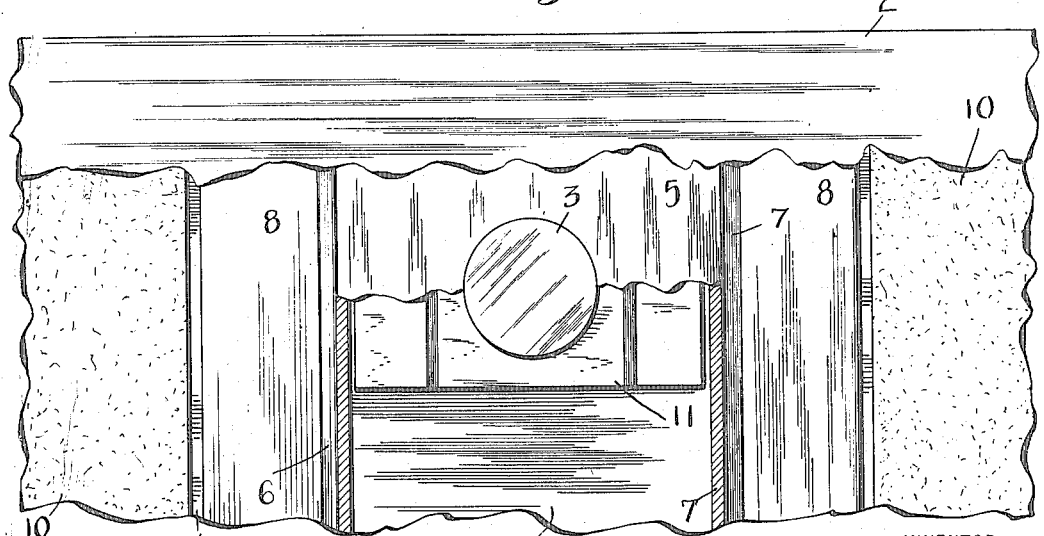

UNITED STATES PATENT OFFICE.

FRED A. RIES, OF PHILADELPHIA, PENNSYLVANIA, ASSIGNOR TO HALE AND KILBURN COMPANY, OF PHILADELPHIA, PENNSYLVANIA, A CORPORATION OF DELAWARE.

SPACED-METALLIC-PANEL CONSTRUCTION.

1,202,316.   Specification of Letters Patent.   Patented Oct. 24, 1916.

Application filed March 27, 1915. Serial No. 17,554.

*To all whom it may concern:*

Be it known that I, FRED A. RIES, a citizen of the United States, residing at Philadelphia, in the county of Philadelphia and State of Pennsylvania, have invented certain new and useful Improvements in Spaced - Metallic - Panel Construction, of which the following is a specification.

My invention relates to spaced metallic panel construction and particularly to sheet-metal panels secured together in parallel relation by metallic members interposed between the panels and welded thereto and shaped members surrounding the welding members and having flanges or portions contacting the inner surfaces of the panels for the purposes of stiffening the panels, maintaining the same in desired spaced relation, and locating the welding members.

More specifically, I employ rigid metallic channel bars having openings through the web portions thereof and having the ends of the side flanges thereof bent at an angle. Metallic spuds are placed in the openings in the webs of the channel bars, these spuds being of a length slightly greater than, or at least equal to, the dimension of the channel bars at right angles to the webs thereof. These channel bars are interposed between the sheet-metal panels to be secured together, with the webs of the bars parallel to one panel and the bent end portions of the side flanges of the channel bars parallel with the other panel. Preferably, the bent ends of the side flanges of the channels are first electric welded to one of the panels, the spuds positioned in the holes through the webs of the channels, after which the second panel is positioned against the ends of the spuds extending through the holes in the webs of the channels, the webs of the channels being not quite in contact with this second panel. The panels are then secured together by directing a welding current through the metal spuds and the adjacent portions of the panels, the terminals of an electric welding machine being positioned against the surfaces of the panels opposite the ends of a spud and a suitable welding pressure employed while the welding current passes through the spud. By this means the ends of each spud are welded to the inner surfaces of the panels and the length of the spuds is reduced sufficiently to bring the webs of the channels into close contact with the inner surface of the adjacent panel.

My invention is particularly advantageous in the construction of doors having sheet-metal panels of considerable size, although it is obvious that it may be employed with good results in other instances in which metal plates are to be joined together in spaced relation. In the construction of doors, it is necessary that the panels be rigid so that they will not weave in and out when the door is slammed or suddenly opened. In doors employing large panels, spacing strips of wood or the like between the panels are not sufficiently rigid to overcome the natural flexibility of the panels and in such cases the employment of the method and construction referred to is of especial advantage, the contacting flanges and webs of the channels adding greatly to the rigidity of the panels as well as serving to locate the spuds which hold the metal panels or sheets together.

I will describe and claim my invention herein both as a process of securing metal panels together, and as a construction resulting from the application of the process.

Advantages of the improved process and construction other than those above referred to, will be more particularly pointed out hereafter.

In order that a clearer understanding of my invention may be had, attention is hereby directed to the accompanying drawings forming part of this application, and illustrating certain embodiments thereof.

In the drawings Figure 1 is a partial section through a pair of panels about to be secured together in the application of the process, certain of the parts being shown separated, Fig. 2 is a similar section after the panels have been secured together, Fig. 3 is a partial bottom plan view of the construction illustrated in Fig. 2, as indicated by line 3—3 in Fig. 2, partly broken away and sectioned, and Figs. 4, 5 and 6 are views similar to Figs. 1, 2 and 3 respectively, of a modified form of my invention.

Referring first to Figs. 1, 2 and 3 of the drawings, the metal panels 1 and 2 are secured together by the metal spuds 3 which extend through the openings 4 in the web portions 5 of the channel bars 6. Only one channel bar and one spud are shown in the drawings, for the sake of simplicity, but it is understood that as many channel bars are to be employed as is found desirable and that as many spuds will be used in connection with each channel as is found desirable. The side flanges 7 of the channels 6 have their ends 8 bent at right angles, that is, into parallel relation with the webs 5 of the channels. In practising the process, the channels 6 may first be placed in position against sheet or panel 1 with the parallel flange portions 8 of the channel contacting the panel, whereupon the flange portions 8 and panel 1 may be electric welded together. Thereafter the spuds 3 may be positioned in the openings 4 of the webs of the channels and the panel 2 properly positioned in contact with the adjacent ends of the spuds, the opposite ends of which are then in contact with panel 1. The terminals 9, 9 of a suitable electric welding machine are then brought in contact with the surfaces of panels 1 and 2 opposite the ends of a spud 3 and electric current passed through the panels and spud while a suitable welding pressure is employed, thereby welding the panels and the spud together, the process being repeated for each of the spuds. As shown in Fig. 1, the spuds are preferably slightly greater in length than the dimension of the channels transverse to the webs thereof, so that the spuds extend a slight distance through the openings in the webs of the channels when the parts are assembled for welding. During the welding operation, the spuds are reduced in length sufficiently to bring the webs of the channels into firm contact with the adjacent panel and to fill up the openings of the webs of the channel, these openings being slightly greater in diameter than the original diameters of the spuds inserted therein.

It has previously been proposed to secure large panels together with channel reinforcements between the same, with the channels so placed between the sheets that the opposite side flanges of the channels are welded to the sheets. That is, in that case no bent over end portions to the channel flanges such as illustrated at 8 herein were employed, the flanges similar to those shown at 7 herein being welded to the sheets, with the webs of the channels extending at right angles to the sheets. To perform the welding successfully in the process referred to, small protuberances or nibs are raised on the surfaces of the channel flanges and the welding occurs through these protuberances, the latter partially melting away as they weld to the sheets or panels. In practising this process a non-conducting mandrel such as a block of wood must be placed between the flanges of the channel to prevent collapse of the latter when the pressure of the welding machine is applied, this mandrel being later withdrawn.

In Figs. 4, 5 and 6, I have shown a modified form of my invention, in which channel-shaped spud holders 11 are added, having base flanges resting upon the web portions 5 of channels 6 and preferably welded thereto, and web portions provided with openings 12 through which the spuds extend. The object of these spud holders is chiefly to hold the spuds more accurately in position, and prevent the same from losing their original position while the current is being applied, the holes 12 in the webs of the spud holders each providing a second bearing for a spud, below sheet 1. In these figures also the flanges 7 of channel bars 6 are given an inclination, preferably of seventy-five degrees to the horizontal flanges, instead of being at right angles thereto, to facilitate manufacture, the corresponding flanges of the spud holders being preferably slanted in the same manner.

In my invention as described herein, less current is required for welding, and panels freer from buckles and defects are produced than in the case above referred to. Moreover, in my method, the panels of a door or similar structure may be assembled after being positioned in the door. That is to say, in my method the channels may be secured to one panel with the spuds positioned in the openings in the webs of the channels, the other panel placed in position and the rails or frame members of the door or other structure applied, after which the panels may be welded together through the spuds, whereas in the process above referred to in which a mandrel is used to prevent the collapse of the channels, the rails of the door must be applied after the panels have been welded together, as otherwise the mandrel could not be removed. In my process, the spuds are preferably extended through openings of the webs of the channels as stated, in order that the spuds may be properly located and so that the welding at one end of the spud need be accomplished through only one thickness of metal instead of two as would be the case if the openings 4 were not provided and the spuds merely contacted the inner surfaces of the channel webs. This latter operation is somewhat difficult to perform with sufficient strength and without buckling or warping the panels.

I have shown an asbestos or similar filling 10 interposed between panels to form a more fireproof construction and to decrease vibration and the transmission of noise and heat through the door or other construction.

Having now particularly described my invention, what I claim and desire to protect by Letters Patent is as follows:

1. The process of securing sheet-metal panels together in spaced relation, consisting in passing through an opening in the web of a rigid channel bar a metal spud fitting therein and of a length at least equal to the dimension of the channel bar transverse to the web, placing said channel bar between metal panels with the ends of the spud in contact therewith, and passing a welding current through said panels and spud while submitting the same to a suitable welding pressure, to weld the same together and cause close contact of the web of said channel bar with one of said panels, and the side flanges of said channel bar with the other of said panels, substantially as set forth.

2. The process of securing sheet-metal panels together in spaced relation, consisting in cutting openings through the web of a channel bar and bending the ends of the side flanges of the channel bar into parallel relation with the web, securing said bent flange ends to a metal panel, inserting in said openings in the web of the channel bar metal spuds of a length at least equal to the dimension of the channel bar transverse to the web, placing a second metal panel in contact with the ends of said spuds extending through said openings, and passing a welding current through said panels and spuds while submitting the same to a suitable welding pressure, to weld the same together and cause close contact of the web of said channel bar with said second panel, substantially as set forth.

3. The process of securing sheet-metal panels together in spaced relation, consisting in passing through an opening in the web of a rigid channel bar a metal spud fitting therein and of a length at least equal to the dimension of the channel bar transverse to the web, positioning a spud holding member, having a similar opening therein, about said spud and in contact with the web of said channel bar, placing said channel bar and spud holder between metal channels with the ends of the spud in contact therewith, and passing a welding current through said panels and spud while submitting the same to a suitable welding pressure, to weld the same together and cause close contact of the web of said channel bar with one of said panels, and the side flanges of said channel bar with the other of said panels, substantially as set forth.

4. In a structure of the character described, a pair of sheet-metal panels in spaced relation, a plurality of rigid channel members interposed between said panels with the web of each of said members contacting one of said panels and having apertures therethrough and bent ends of the side flanges of said members contacting and extending parallel to the other of said panels, and metal spuds extending through the said apertures in the web of each of said members and welded at their ends to both of said panels, substantially as set forth.

5. In a structure of the character described, a pair of sheet-metal panels in spaced relation, a plurality of rigid channel members interposed between said panels with the web of each of said members contacting one of said panels and having apertures therethrough and bent ends of the side flanges of said members contacting and extending parallel to the other of said panels, a plurality of apertured spud-holders interposed between the webs of said channel members and said other panel, and metal spuds, each extending through an aperture in the web of one of said channel members and an aperture in one of said spud holders, said spuds being welded at their ends to each of said panels, substantially as set forth.

This specification signed and witnessed this 19th day of March, 1915.

FRED A. RIES.

Witnesses:
Wm. J. Earnshaw,
Margaret T. Peepels.